United States Patent
Lou et al.

(10) Patent No.: US 9,791,852 B2
(45) Date of Patent: Oct. 17, 2017

(54) APPARATUS AND METHOD FOR CONTROLLING AT LEAST ONE OPERATIONAL PARAMETER OF A PLANT

(71) Applicant: General Electric Technology GmbH, Baden (CH)

(72) Inventors: Xinsheng Lou, West Hartford, CT (US); Chuan Wang, Farmington, CT (US); Carl H. Neuschaefer, Enfield, CT (US); Armand A. Levasseur, Windsor Lock, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 535 days.

(21) Appl. No.: 14/465,217

(22) Filed: Aug. 21, 2014

(65) Prior Publication Data

US 2016/0054730 A1     Feb. 25, 2016

(51) Int. Cl.
*G05B 19/418* (2006.01)
*F01K 7/24* (2006.01)
*F01K 13/02* (2006.01)
*F23N 5/02* (2006.01)
*F22G 5/12* (2006.01)

(52) U.S. Cl.
CPC .............. *G05B 19/418* (2013.01); *F01K 7/24* (2013.01); *F01K 13/02* (2013.01); *F22G 5/12* (2013.01); *F23N 5/022* (2013.01); *F23N 2041/10* (2013.01); *G05B 2219/31103* (2013.01); *Y02E 20/326* (2013.01); *Y02E 20/328* (2013.01); *Y02E 20/344* (2013.01)

(58) Field of Classification Search
None
See application file for complete search history.

(56) References Cited

U.S. PATENT DOCUMENTS

| | | | |
|---|---|---|---|
| 6,505,567 B1 | 1/2003 | Anderson et al. | |
| 7,194,320 B2 * | 3/2007 | Lefebvre | G05B 7/02 700/109 |
| 7,954,458 B2 | 6/2011 | Bozzuto et al. | |
| 2004/0243636 A1 * | 12/2004 | Hasiewicz | G05B 23/0251 |

(Continued)

FOREIGN PATENT DOCUMENTS

EP     2 497 560 A1     9/2012
WO    WO 2013/024337 A1   2/2013

(Continued)

*Primary Examiner* — Tuan Dao
(74) *Attorney, Agent, or Firm* — GE Global Patent Operation; Stephen G. Midgley (57) ABSTRACT

A method for controlling at least one operational parameter of a plant (1) having a combustion unit (3) can include estimating a status of at least one operational variable of the plant to identify an estimated value for the operational variable. For each operational variable, the estimated value for the operational variable can be compared with a measured value of the operational variable to determine an uncertainty value based on a difference in value between the measured value and the estimated value for the operational variable. A control signal can be generated based on a reference signal, the measured value, and the deviation value for sending to at least one element of the plant (1) for controlling a process of the plant (1).

13 Claims, 5 Drawing Sheets

(56) References Cited

U.S. PATENT DOCUMENTS

| | | |
|---|---|---|
| 2008/0288198 A1* | 11/2008 | Francino ............. F01K 13/02 702/84 |
| 2009/0133611 A1 | 5/2009 | Morin et al. |
| 2010/0236500 A1 | 9/2010 | Douglas et al. |
| 2012/0052450 A1 | 3/2012 | Lou et al. |
| 2012/0145052 A1 | 6/2012 | Levasseur et al. |
| 2013/0167583 A1 | 7/2013 | Stallmann |
| 2013/0205827 A1 | 8/2013 | Stallmann |
| 2013/0255272 A1 | 10/2013 | Ajhar et al. |
| 2013/0291719 A1 | 11/2013 | Stallmann |
| 2013/0298599 A1 | 11/2013 | Stallmann et al. |
| 2013/0315810 A1 | 11/2013 | Stallmann et al. |
| 2014/0004028 A1 | 1/2014 | Stallmann |
| 2014/0026613 A1 | 1/2014 | Stallmann |
| 2014/0065046 A1 | 3/2014 | Stallmann et al. |
| 2014/0065560 A1 | 3/2014 | Stallmann et al. |
| 2014/0106284 A1 | 4/2014 | Stallmann |

FOREIGN PATENT DOCUMENTS

| | | |
|---|---|---|
| WO | WO 2013/024339 A1 | 2/2013 |
| WO | WO 2013/027115 A1 | 2/2013 |
| WO | WO 2013/057661 A1 | 4/2013 |
| WO | WO 2013/144853 A1 | 10/2013 |

* cited by examiner

APPARATUS AND METHOD FOR CONTROLLING AT LEAST ONE OPERATIONAL PARAMETER OF A PLANT

FIELD

The present disclosure relates to a control system for control of at least one element of a plant and methods of operating the same.

BACKGROUND

Energy production systems that burn coal or other type of fuel to produce power may include at least one boiler or other type of combustor and a turbine. Examples of electricity production systems that can be utilized in electricity production and components of such systems are disclosed in U.S. Patent Application Publication Nos. 2014/0106284, 2014/0065560, 2014/0065046, 2014/0026613, 2014/0004028, 2013/0315810, 2013/0298599, 2013/0291719, 2013/0255272, 2013/0205827, 2013/0167583, 2012/0052450, 2012/0145052, 2010/0236500, and 2009/0133611 and U.S. Pat. Nos. 7,954,458 and 6,505,567, European Patent Application Publication No. EP 2 497 560, and International Publication Nos. WO 2013/144853, WO 2013/057661, WO 2013/027115, WO 2013/024339, and WO 2013/024337. For instance, U.S. Patent Application Publication No. 2012/0145052 discloses that an oxy-combustion system may include an air separation unit, a boiler, an air pollution control system, and a gas processing unit for separating carbon dioxide from flue gas. The heat from the flue gas of the boiler may be captured by steam, which is then used to drive a steam turbine generator to produce electricity. The flue gas may then be processed to remove certain pollutants (e.g. $NO_x$, $SO_x$, etc.) and a portion of the treated flue gas may then be recycled to the boiler to effect combustion.

SUMMARY

According to aspects illustrated herein, there is provided a method of controlling at least one operational parameter of a plant having a combustion unit. The method can include the steps of (a) estimating a status of at least one operational variable of the plant to identify an estimated value for the operational variable, (b) for each operational variable, comparing the estimated value for the operational variable with a measured value of the operational variable to determine an uncertainty value based on a difference in value between the measured value and the estimated value for the operational variable, and (c) generating a control signal based on a reference signal, the measured value, and the deviation value for sending to at least one element of the plant for controlling a process of the plant.

According to other aspects illustrated herein, an apparatus can include at least one controller configured to be connected to a combustion unit of a plant. The controller can include hardware having at least one processor, non-transitory memory communicatively connected to the processor, and at least one transceiver unit communicatively connected to the processor. The controller can be configured to communicate with at least one element of the combustion unit to control at least one operational parameter of the combustion unit when connected to the combustion unit. The controller can be configured to execute a control process which includes: (a) estimating a status of at least one operational variable of the plant to identify an estimated value for the operational variable, (b) for each operational variable, comparing the estimated value for the operational variable with a measured value of the operational variable to determine an uncertainty value based on a difference in value between the measured value and the estimated value for the operational variable; and (c) generating a control signal based on a reference signal, the measured value, and the deviation value for sending to at least one element of the plant for controlling a process of the plant.

The above described and other features are exemplified by the following figures and detailed description.

BRIEF DESCRIPTION OF THE DRAWINGS

Exemplary embodiments of an apparatus, a plant, and associated exemplary methods are shown in the accompanying drawings. It should be understood that like reference numbers used in the drawings may identify like components, wherein.

Other details, objects, and advantages of embodiments of the innovations disclosed herein will become apparent from the following description of exemplary embodiments and associated exemplary methods.

DETAILED DESCRIPTION

Figure 1:
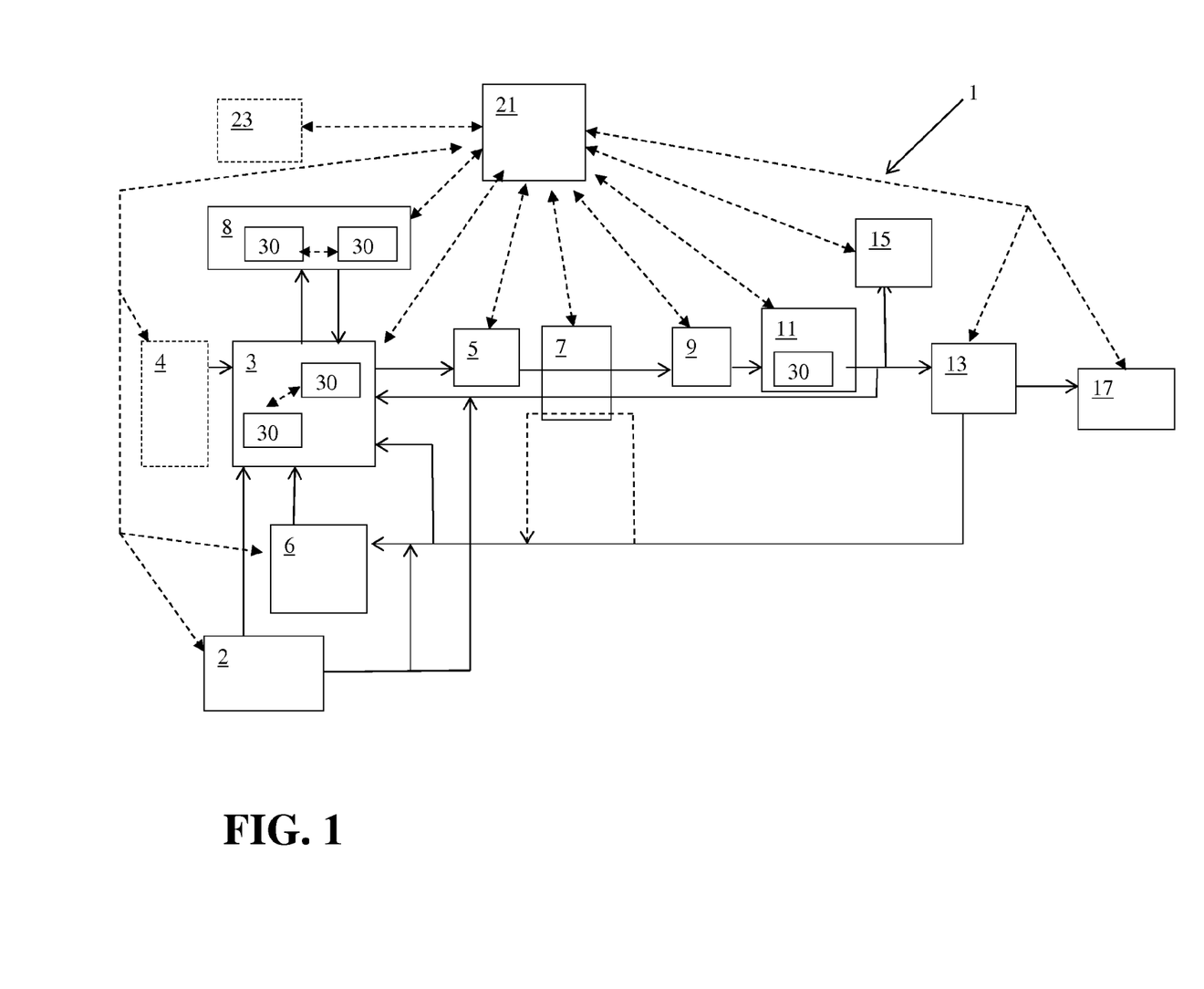
FIG. 1 is a block diagram of a first exemplary embodiment of a plant.
Figure 2:
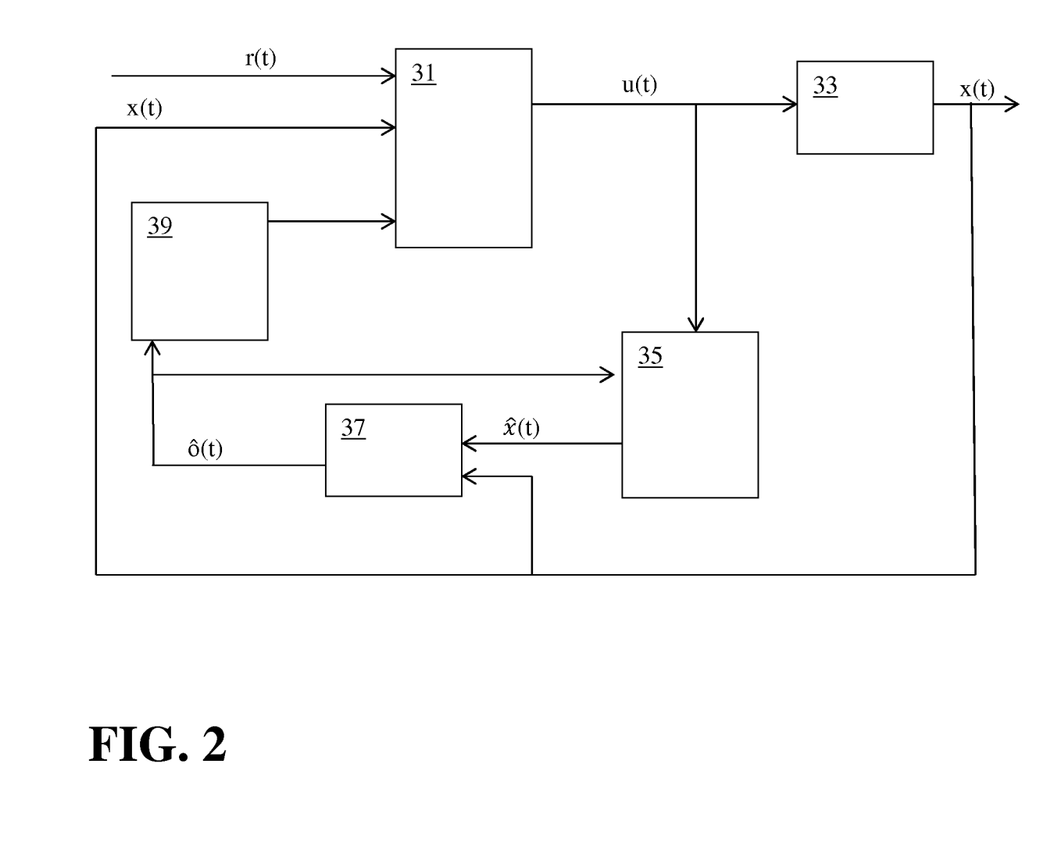
FIG. 2 is a schematic diagram illustrating a first exemplary architecture for the exemplary adaptive second controllers of the first exemplary embodiment of the plant
Figure 3:
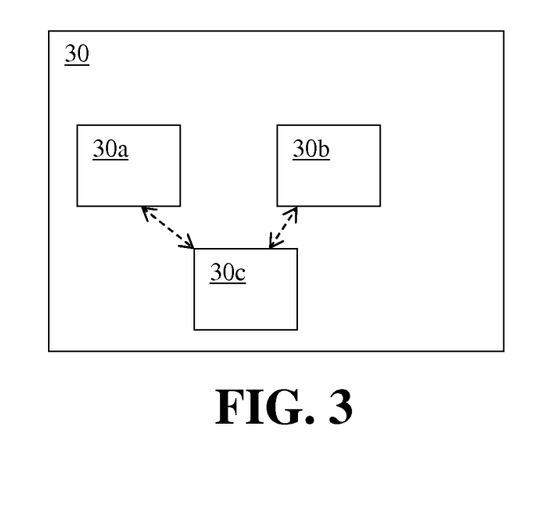
FIG. 3 is a block diagram of an exemplary embodiment of a second controller of the first exemplary embodiment of the plant.

Referring to FIGS. 1-3, a plant 1 can be configured as an industrial plant, power plant, or electricity generation plant. The plant 1 can be configured to include a combustion unit 3. The combustion unit can include a combustor such as a furnace or boiler that is configured to combust a fossil fuel (e.g. coal, natural gas, etc.) or other type of fuel to form combustion products (e.g. steam, carbon dioxide, carbon monoxide, etc.) at a temperature within a desired pre-specified temperature range. Steam emitted by the combustion unit can be utilized to generate electricity or otherwise provide thermal energy for conversion into a desired system output. Flue gas emitted from the combustion process can be routed through a series of other devices configured to treat the flue gas prior to the flue gas being emitted from the plant. The treatment of the flue gas can be configured to help ensure that the emitted flue gas complies with applicable emission regulations or otherwise meets a desired set of design criteria.

In some embodiments, the plant 1 can be configured as an oxygen fired plant that is configured to generate electricity from the burning of a fossil fuel. For example, some embodiments of the plant can be configured as an oxygen fired pulverized coal plant. As another example, other embodiments of the plant 1 can be configured as an oxygen fired natural gas plant.

An embodiment of the plant 1 can be configured to include an air separation unit (ASU) 2 that is configured to separate oxygen from other air components (e.g. nitrogen, carbon dioxide, etc.) and feed a substantially oxygen gas flow separated from the air to the combustion unit 3 as a first oxidant gas flow via a first oxidant feed conduit connected between the ASU 2 and the combustion unit 3. The first oxidant gas flow can be a fluid that is substantially composed of oxygen (e.g. more than 80 mole percent oxygen, 90-99 mole percent oxygen, 95-98 mole percent oxygen, more than 80 weight percent oxygen, or 90-99 weight percent oxygen, 90-95 weight percent oxygen).

A fuel source 6 can be connected to the combustion unit 3 for feeding fuel to the combustion unit. The fuel source 6 can be, for example, a coal mill that pulverizes coal for providing the coal to the combustion unit 3 or can be another type of fuel source. The combustion unit 3 can be configured as a boiler such as an oxygen fired boiler, or can be configured as a furnace or other type of combustor.

A second oxidant flow can be fed to the combustion unit 3. That second oxidant flow can include a mixture of fuel, flue gas being recycled back to the combustion unit 3 and oxygen from the ASU 2. The oxygen flow from the ASU that is mixed with the flue gas and fuel can be a flow of fluid that is substantially oxygen (e.g. a flow of fluid that is more than 80 mole percent oxygen, 90-99 mole percent oxygen, 95-98 mole percent oxygen, more than 80 weight percent oxygen, or 90-99 weight percent oxygen, 90-95 weight percent oxygen). The portion of flue gas that was previously emitted by the combustion unit 3 can be recycled back to the fuel source 6 for being mixed with the fuel. Oxygen from the ASU can be fed to this portion of the flue gas prior to being fed to the fuel source 6. The mixture of the substantially pure oxygen fluid from the ASU 2, recycled portion of the flue gas, and fuel from the fuel source 6 can be fed to the combustion unit via a fuel feed conduit connected between the fuel source 6 and the combustion unit 3. The oxygen content of the fluid that is mixed with fuel and subsequently fed to the combustion unit can be configured to not exceed 23.5 mole percent oxygen. In some embodiments, the oxygen concentration for the mixture of fuel and fluid can be controlled to be between 16-24 or 18-22 mole percent oxygen.

A third oxidant flow of fluid can also be fed to the combustion unit 3 for combusting the fuel fed to the combustion unit 3. For instance, a portion of flue gas previously output by the combustion unit can be recycled back to the combustion unit for use in the combustion of the fuel. A portion of the recycled flue gas can also be mixed with a substantially pure flow of oxygen from the ASU 2 (e.g. a flow of fluid that is more than 80 mole percent oxygen, 90-99 mole percent oxygen, 95-98 mole percent oxygen, more than 80 weight percent oxygen, or 90-99 weight percent oxygen, 90-95 weight percent oxygen) prior to this mixture of fluid being fed to the combustion unit 3. This mixture of recycled flue gas and flow of fluid that contains a substantial amount of oxygen from the ASU can be mixed such that an oxygen content of 23.5% or less of oxygen is within the third oxidant flow. In some embodiments, the oxygen content of the mixture of recycled flue gas and oxygen that is subsequently fed to the combustion unit as the third oxidant flow can be configured to be between 16-24 or 18-22 mole percent oxygen.

The combustion unit 3 can be configured to combust the fuel from the fuel source 6 in the presence of the oxidant flows fed to the combustion unit 3 to produce steam and flue gas. The steam can be fed to a power generation unit 8 such as at least one turbine of a generator via a steam transport conduit connected between the combustion unit 3 and the power generation unit 8. Flue gas formed in the combustion unit 3 can be separated from the steam and subsequently sent toward a number of flue gas treatment devices for treating the flue gas prior to recycling the flue gas within the plant 1 and/or emitting a portion of the flue gas to the atmosphere external to the plant 1.

In some embodiments, the combustion unit 3 can also be configured to combust fuel from the fuel source via air fed to the combustion unit via an air feeding device 4 as shown in broken line in FIG. 1. The air feeding device 4 may include at least one pump or fan that is configured to drive air from the atmosphere into the combustion unit 3 for use in combusting the fuel from the fuel source 6. An air feed conduit can be connected between the air feeding device 4 and the combustion unit 3 for feeding the air to the combustion unit. When the combustion unit 3 is to combust the fuel via use of air from the air feeding device 4, isolation dampers or other dampening elements can be actuating for shutting off flue gas recirculation from flue gas treatment devices within the plant and oxidant flow feeding from the ASU 2 so that the combustion unit 3 only utilizes air for the combustion of fuel. In some embodiments, the plant 1 can be configured such that the combustion unit 3 is switchable from being air fired in which dampening elements are moved to close off oxidant flows and flue gas recycling to an oxidant flow fired mode in which air from the air feeding device 4 is no longer fed to the combustion unit and the dampening elements are moved to open the oxidant flows and flue gas recycling flows for feeding to the combustion unit 3.

Flue gas from the combustion unit 3 can be transported to a scrubber 5 that may expose the flue gas to a sorbent for removal of sulfur oxides (e.g. $SO_3$) or other elements from the flue gas. The flue gas may be fed to the scrubber 5 via a scrubber feed conduit connected between the combustion unit 3 and the scrubber 5. The flue gas can be emitted from the scrubber 5 and fed to a preheater 7 for feeding a portion of flue gas being recycled back to the combustion unit 3 and/or any oxygen containing fluid from the ASU 2 that may be mixed with that flue gas prior to the recycled flue gas being passed through the preheater 7. Heat from the emitted flue gas after it has been passed through the scrubber 5 can be utilized for transferring heat from that flue gas to the recycled portion of the flue gas prior to the recycled flue gas being fed to the combustion unit 3.

After the flue gas has passed through the preheater 7, the flue gas may be sent to a particulate collector device 9 via a particulate collector feed conduit connected between the preheater 7 and the particulate collector device 9. The particulate collector device 9 can be configured as a dust eliminator, an electrostatic precipitator, a particulate filter, or other type of particulate removal device. The particulate collector device 9 can be configured to separate fly ash and other particulates from the flue gas received from the combustion unit 9.

After the flue gas is treated by the particulate collector device 9, the treated flue gas can be sent to a desulfurization unit 11 that is configured to remove sulfur oxides from the flue gas. The desulfurization unit 11 can be configured as a dry flue gas desulfurization system or a wet flue gas desulfurization system, for example. The desulfurization unit 11 can receive the flue gas from the particulate collector device 9 via a desulfurization unit feed conduit connected between the desulfurization unit 11 and the particulate collector device 9.

After the flue gas is treated by the desulfurization unit 11, it can be fed to a gas processing unit (GPU) 13 via a GPU feed conduit connected between the desulfurization unit 11 and the GPU 13. Prior to being fed to the GPU 13, the flue gas can be split into a first portion, a second portion, and a third portion. The first portion of the flue gas can be recycled to the combustion unit 3 for mixing with oxygen containing fluid from the ASU 2 to form the third oxidant flow for feeding to the combustion unit 3 via a first recycle conduit connected between the combustion unit 3 and the desulfurization unit 11. The second portion of the flue gas can be transported to the GPU 17 via the GPU feed conduit. The third portion of the flue gas can be fed to a stack 15 for emitting to the atmosphere via a stack feed conduit connected between the desulfurization unit 11 and the stack 15. In some embodiments, the stack 15 can be configured as a heat recovery steam generator ("HRSG") that is configured to utilize heat from the third portion of the flue gas to heat water or other fluids for use in other plant processes.

The GPU 13 can be configured to remove a substantial portion of carbon dioxide from the flue gas to capture that carbon dioxide and output a fluid that is substantially composed of carbon dioxide for storage, further purification, or other distribution. The GPU 13 can be configured to feed a first portion of the flue gas treated by the GPU 13 to have a substantially lower portion of carbon dioxide to a storage device 17 for further processing or for storing the flow of fluid after the GPU 13 has processed that flue gas. For instance, the storage device 17 can be a sequestration storage device for receiving a first portion of treated flue gas via an outlet conduit connected between storage device 17 and GPU 13. A second portion of the flue gas treated by the GPU 17 can be distributed to the fuel source 6 for being used in operations for treating the fuel prior to feeding the fuel to the combustion unit 3. A fuel source conduit can be connected between the GPU 13 and fuel source 6 for recycling that portion of the flue gas after that gas was processed by the GPU 13 to remove carbon dioxide from the flue gas. A portion of the flue gas fed from the GPU 13 to the fuel source 6 can be passed through the preheater 7 via a preheating conduit included within the fuel source conduit connected between the GPU 13 and the fuel source 6. Oxygen containing fluid from the ASU 2 can be mixed with the portion of the flue gas recycled to the fuel source after it was processed by the GPU 13 prior to that mixture being fed to the fuel source 6 or after both fluids are fed to the fuel source 6.

The fluid substantially composed of carbon dioxide generated by the treatment of the flue gas performed by the GPU 13 can be output to the storage device 17 or other type of processing device via a carbon dioxide fluid output conduit connected between the GPU 13 and storage device 17. The substantially pure carbon dioxide containing fluid can be composed of 80-100 molar percent carbon dioxide or greater than 70 molar percent carbon dioxide for some embodiments of the plant. For instance, some embodiments of the plant can be configured so that the substantially pure carbon dioxide containing fluid output by the GPU 13 can be between 92-98 molar percent carbon dioxide.

In some embodiments, the substantially pure carbon dioxide containing fluid stored in the storage device 17 can also be subsequently processed further for forming a product to be distributed to a vendor that desires such a compound. In other embodiments, that fluid may be stored for a relatively long period of time for sequestration of the carbon dioxide.

At least one first controller 21 can be communicatively connected to the ASU 2, the fuel source 6, the combustion unit 3, the power generation unit 8, the scrubber 5, the preheater 7, the particulate collector device 9, the desulfurization unit 11, the GPU 13, stack 15 and storage device 17, as indicated by the broken line arrows in FIG. 1. The first controller 21 can also be communicatively connected to conduit elements connected between such devices, valves, proportional-integral-derivative controllers, and measurement sensors such as flow sensors, temperature sensors, and pressure sensors connected to portions of conduits or portions of the GPU 13, storage device 17, stack 15, combustion unit 3, ASU 2, fuel source 6, scrubber 5, power generation unit 8, particulate collector device 9, and desulfurization unit 11 as indicated by broken line arrows in FIG. 1 such that the first controller 21 can receive information relating to one or more parameters of operation of the plant 1 and/or operation of combustion unit 3, ASU 2, GPU 13, and/or other plant elements. Additionally, the first controller 21 can be communicatively connected to one or more adaptive second controllers 30 that can be connected to the combustion unit 3, power generation unit 8, desulfurization unit 11, and/or other elements of the plant.

The first controller 21 can be an electronic device such as a computer, workstation, computer device, or other type of electronic device controller that includes hardware. For instance, the first controller 21 can include hardware that comprises at least one non-transitory memory, at least one transceiver unit that can include at least one receiver and at least one transmitter configured for communicating with other devices to which the first controller 21 is communicatively connected, and at least one processor connected to the memory and transceiver unit. The transceiver unit can also be configured to permit the controller 21 to communicate with remote devices via a network connection such as the internet or an intranet. The processor can be a central processing unit, a microprocessor, or other type of hardware processor element configured to run one or more applications stored on the memory such that the controller 21 is able to perform a method defined by code or other instructions of those one or more applications stored in the memory. For instance, the controller 21 can have a model predictive control program stored in the memory of the controller 21 that can be run by the processor to control operations of the combustion unit 3 and/or plant 1. In some embodiments, the first controller can configured as a distributed control system for the plant or component of such a distributed control system for the plant. In other embodiments, the first controller 21 can communicate with another computer device 23 that is configured as the distributed control system as shown in broken line in FIG. 1.

Second controllers 30 can be connected to the combustion unit 3 as well as other elements of the plant for controlling different operational parameters of the combustion unit 3, power generation unit 8, desulfurization unit 11, or other plant elements. As may be appreciated from FIG. 3, each second controller 30 can be configured as an electronic device that includes hardware such as non-transitory memory 30a, at least one transceiver unit 30b, and at least one processor 30c. For instance, each second controller 30 can be configured as an adaptive controller. The non-transitory memory 30a can be a hard drive, flash memory, or other type of non-transitory storage device that is able to store computer readable media (e.g. applications or programs) that is accessible by the processor 30c and executable by the processor 30c. The processor 30c can be a microprocessor, interconnected microprocessors, a central processing unit, a particular type of hardware circuit that is configured to process signaling based on the structure of that circuit, or other type of hardware processor element. In some embodiments, the processor 30c is configured to communicate with memory to execute code stored in the memory. The transceiver unit 30b can include at least one wireless transceiver and/or at least one wired transceiver for enabling communication between the second controller 30 and one or more sensors or detectors to which the second controller is connected, at least one other second controller 30 and/or the first controller 21. The transceiver unit 30b can include multiple receivers and multiple different transmitters for facilitating communications between the second controller 30 and the elements to which it is communicatively connected via wired and/or wireless communication paths.

Each second controller 30 can be have an architecture that includes a control law component 31, a state predictor component 35, and an adaptive law component 37. The architecture can also include at least one filter 39. The control law component 31 can be configured to generate a control signal based on a reference signal r(t), measurable states x(t) received from one or more elements 33 of the plant 1 to which it is connected (e.g. temperature sensors, pressure sensors, flow rate sensors, etc.) and output from the adaptive law component 37. The state predictor component 35 can be configured to perform an estimation of each measurable state in a process to be controlled by the second controller 30 based on the control signal generated by the control law component. The adaptive law component 37 is configured to estimate uncertainty ô(t) between the measured states x(t) and the estimated states x̂(t) based on the deviation between the measured states and the estimated states. The filter 39 can be configured to filter the uncertainty output ô(t) of the adaptive law component based on a pre-selected set of criteria.

The control law component 31, a state predictor component 35, and an adaptive law component 37 can be configured to be processed simultaneously so that each component is to be solved at the same time by the controller for use in generation of the control signal. For instance, the state predictor component 35 can be configured to estimate the status of the at least one operational variable of the plant 1 to identify the estimated value for the operational variable based on calculating:

$$\hat{x}(t) = A_m \hat{x}(t) + B_m u(t) + \hat{o}(t), \text{ where:}$$

t is time within a sampling time (T),
u(t) is a control signal value,
x̂(t) is an estimated value for the operational variable at time (t);
$A_m$ is a first model parameter of a state predictor,
$B_m$ is a second model parameter of the state predictor,
and ô(t) is equal to ô((iT), t∈(iT, i+1)T), where i is an integer within a pre-specified range of integers and where:
ô((iT) is equal to $-\Phi^{-1}(T)\mu(iT)$,
$\Phi(T)$ is equal to $\int_0^T e^{A_m(T-\tau)}d\tau$,
$\mu(iT)$ is equal to $e^{A_m T} \tilde{x}(iT)$, and
x̃ is a difference between the estimated value for the operational variable and the measured value for the operational parameter.

The adaptive law component 37 can be configured to compare the estimated value for at least one operational variable with a measured value of the operational variable to determine an uncertainty value based on a difference in value between the measured value and the estimated value for the operational variable based on calculating x̃=x(t)−x̂(t), where x(t) is the measured value for the operational parameter at time (t).

The control law component 31 can be configured to generate the control signal based on calculating $$u(s) = k_g r(s) + C(s) B_m^{-1} \hat{o}(s), \text{ where:}$$

u(s) is a Laplace transform of u(t),
kg is a DC gain of an internal model,
r(s) is a Laplace transform of a reference signal r(t), and
C(s) is a Laplace transform of a filter.

The second controller 30 can be configured so that $u(s) = k_g r(s) + C(s) B_m^{-1} \hat{o}(s)$, $\hat{x}(t) = A_m \hat{x}(t) + B_m u(t) + \hat{o}(t)$, and $u(s) = k_g r(s) + C(s) B_m^{-1} \hat{o}(s)$ are to be calculated simultaneously. The filter 39 can be configured to filter the output of the adaptive law component 37 based on a pre-selected set of criteria to refine how the uncertainty estimate made by the adaptive law component is utilized by the control law component to generate the control signal u(t). The control signal u(t) generated by the second controller 30 can be sent to the one or more elements to which the adaptive second controller 30 is connected to control operation of those elements so that operations of the plant 1 or a component of the plant 1 are adjusted to keep at least one operational parameter (e.g. steam temperature of the combustion unit 3, pressure of the combustion unit 3, flue gas flow rate for flue gas emitted from the combustion unit 3, etc.) within a tolerance range of a desired value for that operational parameter. The parameters $A_m$ and $B_m$ and a bandwidth of the filter 39 can be tuned to a desired degree so that the adaptive controller 30 can achieve a desired control performance.

Embodiments of the second controller 30 can be utilized in control loops for different plant elements (e.g. the combustion unit 3, etc.). For example, embodiments of the second controller 30 can be utilized in a control loop configured for implementing combustion control of combustion that occurs in the combustion unit 3. The combustion control loop can be configured to coordinate fuel and oxidant flows, maintain stability of combustion occurring in the combustion unit, and oversee combustion mode transitions that may occur when the combustion unit is switched from air-fired combustion mode to an oxy-fired combustion mode. The second controllers can also be included in a control loop configured to provide stoichiometry control that can be configured to maintain the combustion stability and efficiency while also minimizing production of nitrous oxide elements within the flue gas via staging of combustion of the fuel in the combustion unit. Embodiments of the second controller can also be utilize in water/steam control oops that can be configured to coordinate feedwater flow to a boiler of the combustion unit 3, control super-heated steam and reheated steam temperatures, and maintain the super-heated steam spray valves in different operating ranges.

Figure 4:
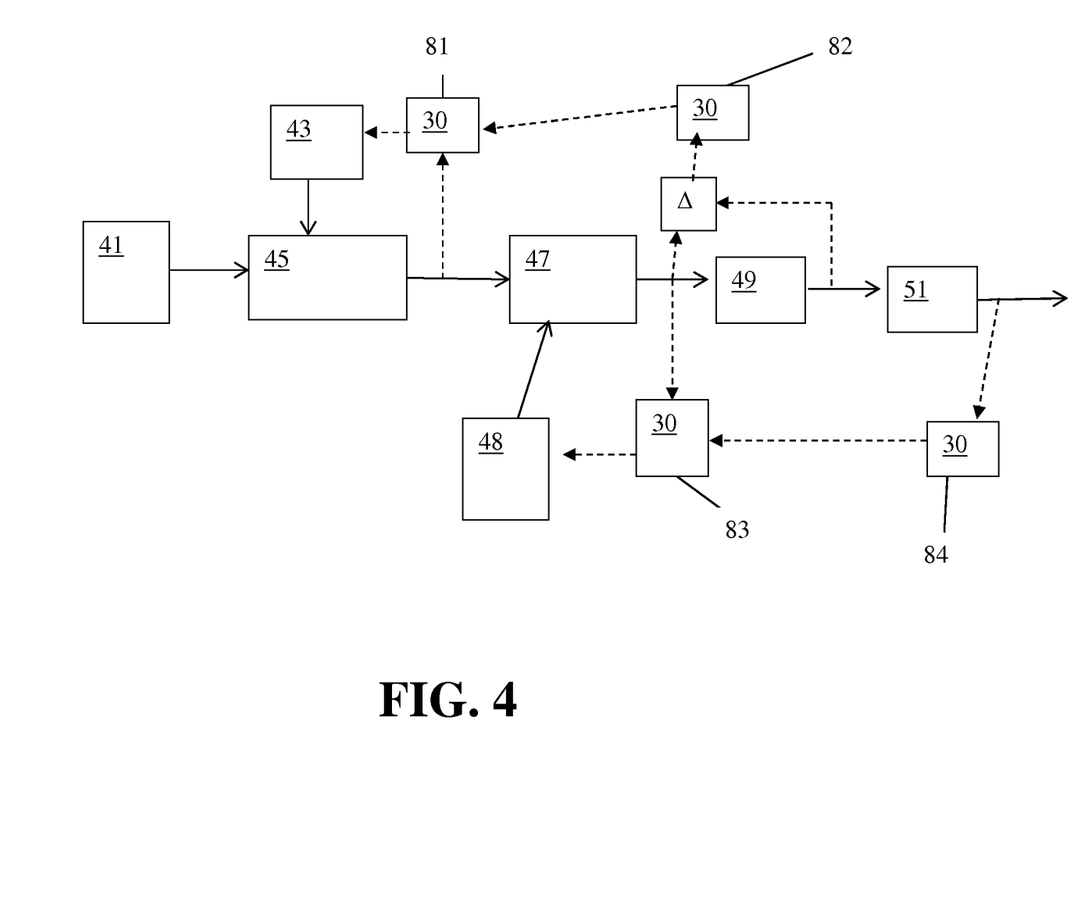
FIG. 4 is a block diagram of a first exemplary control loop of the first exemplary embodiment of the plant.

For example, FIG. 4 illustrates an exemplary control loop of the plant 1 can include multiple second controllers 30 for utilization in controlling operations of the plant 1 to maintain a temperature of the main steam of the combustion unit 3 that is to be sent to a high pressure turbine of the power generation unit 8. A flow of steam can be passed through super-heated panels 41 before being passed through a first desuperheater device 45 that receives water for being sprayed on this flow of steam that passes through the first desuperheater device 45 via a water feed conduit that includes a first control valve 43 that is adjustable to control a flow rate of water being fed to the first desuperheater device 45. After the steam is passed through the first desuperheater device 45, the fluid can be passed through a super-heated steam platen device 47 prior to being passed through a second desuperheater device 49 that receives water for sprayers of the second desuperheater device 49 from a second control valve 48 that is connected to a water source via a second water deed conduit. That water source can be the same water source or a different water source that is connected to the first desuperheater device 45 via the first control valve 43. The fluid can be output from the second desuperheater device 49 to a heat exchanger 51 that may be configured as a final super heater. After being passed through the heat exchanger 51, the steam can be subsequently fed to a high pressure turbine of the power generation unit 8. A plurality of second controllers 30 can be connected to different portions of the main steam circuit to help control the temperature of the steam to be output to the high pressure turbine. For instance, a first steam temperature controller 81 can be communicatively connected to the first control valve 43 to control a flow rate of water to be fed to the sprayers of the first desuperheater device. The first steam temperature controller 81 can receive data from measurement devices connected to the first desuperheater device 45 and/or an output conduit of that device as well as receiving additional data from a second steam temperature controller 82. The data received from the second steam temperature controller 82 can be a signal that is sent to the first steam temperature controller 81 that the second steam temperature controller 82 generates based on data received from measurement devices identifying temperatures of the steam at the inlet and outlet of the second desuperheater device 49 to identify a difference between a temperature of steam fed to the second desuperheater device 49 and the temperature of the steam output from the second desuperheater device. The data the second steam temperature controller 82 sends to the first steam temperature controller 81 can also be based on a set point value that second steam temperature controller 82 can receive from the distributed control system 23 and/or first controller 21. Alternatively, this set point value can be otherwise defined in memory of the second steam temperature controller 82. In some embodiments, a differential detector device Δ that receives temperature data for steam being input to and output from the second desuperheater device 49 can sends a signal to the second temperature controller 82 to identify a difference between a temperature of steam fed to the second desuperheater device 49 and the temperature of the steam output from the second desuperheater device 49.

A third steam temperature controller 83 can be connected to the second control valve 48 to control a flow rate of water fed to the sprayers of the second desuperheater device 49. The control signal that is generated by the third steam temperature controller 83 can be based on a temperature of the steam output from the second desuperheater device 49 that is received from a measurement device as well as data received from a fourth steam temperature controller 84. The fourth steam temperature controller 84 can generate the data sent to the third steam temperature controller 83 based on a set point value and a temperature of the steam output from the heat exchanger 51 for being output to a high pressure turbine. The temperature data received by the fourth steam temperature controller 84 can be from a measurement device connected to a conduit through which the output steam flows and the set point value can be received from the first controller 21 or the distributed control system 23. Alternatively, this set point value can be defined in memory of the fourth steam temperature controller 84.

Figure 5:
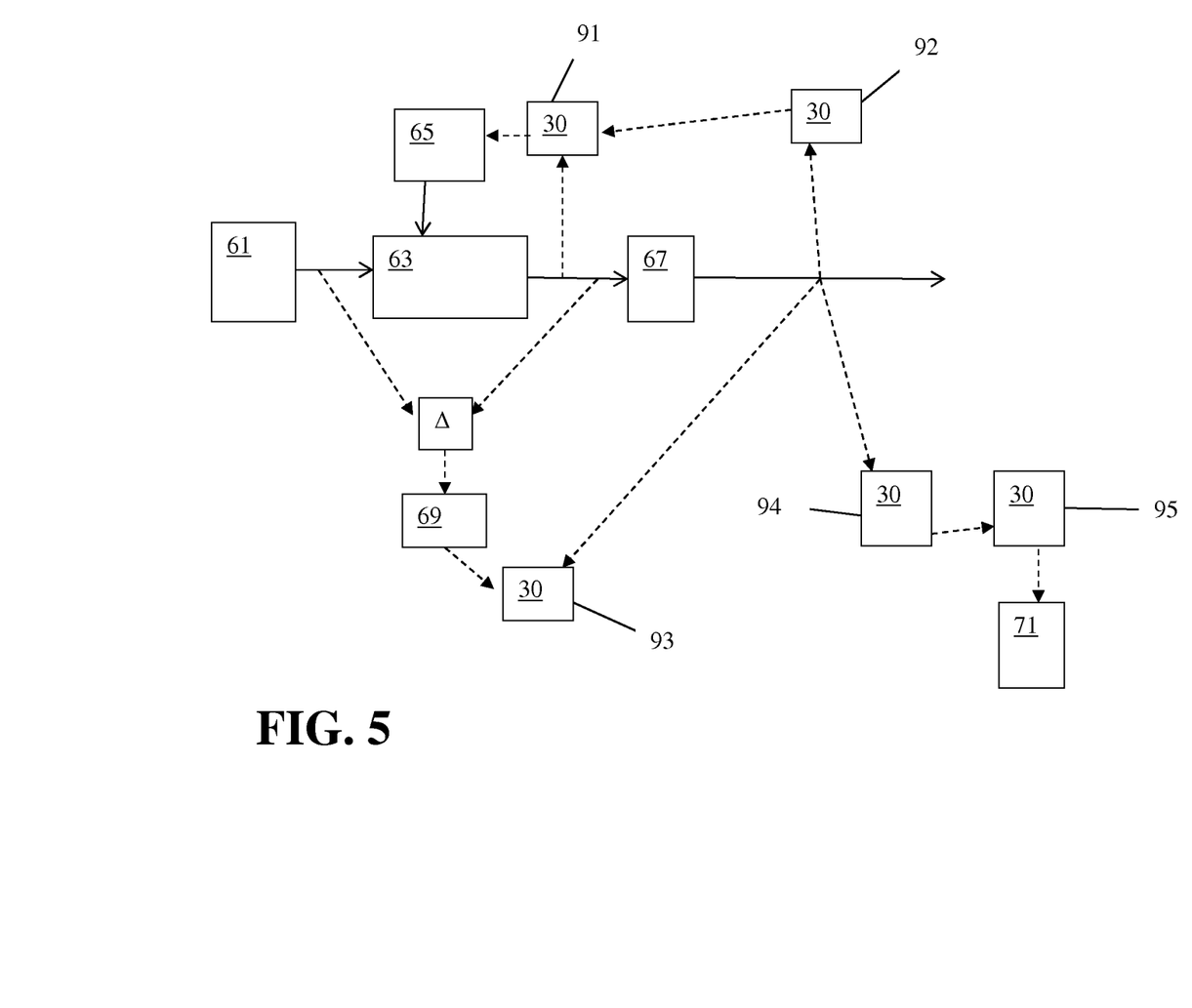
FIG. 5 is a block diagram of a second exemplary control loop of the first exemplary embodiment of the plant.

FIG. 5 illustrates another exemplary control loop for reheated steam that can be sent to intermediate pressure and/or low pressure turbines of the power generation unit 8 in which embodiments of second adaptive controllers 30 can be utilized in embodiments of the plant. The reheat steam control loop can include a first low temperature reheater device 61 that can be configured to reheat fluid for generating reheat steam for subsequently supplying to an intermediate pressure turbine and/or a low pressure turbine. After being reheated in the reheater device 61, the heated steam can be passed through a first reheat steam desuperheater device 63 via a first reheat steam feed conduit connected thereto. The steam output from the first reheat steam desuperheater device 63 can be fed to a second reheater device 67 via a reheat steam desuperheater output conduit. The second reheater device 67 can heat the steam to a temperature within a pre-selected temperature range for sending to the intermediate pressure turbine and/or low pressure turbine. Water to be sprayed into the steam via sprayers of the first reheat steam desuperheater device 63 can be received from a water source via a third control valve 65 that is adjustable to adjust a flow rate of water being fed to the sprayers. A first reheat steam controller 91 can be communicatively connected to the third control valve 65 to send a signal to the third control valve for controlling that valve and the flow rate of water to be fed to the sprayers of the first reheat steam desuperheater device 63. The first reheat steam controller 91 can receive data from a measurement device that sends data to the first reheat steam controller 91 based on the temperature of steam output by the first reheat steam desuperheater device 63. The first reheat steam controller 91 can also receive data from a second reheat steam controller 92. The control signal sent to the third control valve 63 via the first reheat steam controller 91 can be generated by the first reheat steam controller 91 based on the data relating to the temperature of the steam output by the first reheat steam desuperheater device 63 that it receives from a measurement sensor or detector device and the data received from the second reheat steam controller 92.

The second reheat steam controller 92 can send data to the first reheat steam controller 91 based on a set point value and data relating to a temperature of the reheat steam output from the second reheater device 67 that may be the temperature of the reheat steam to be output to the low and/or intermediate pressure turbines of the power generation unit 8. The data relating to the temperature of the reheat steam output from the second reheater device 67 can be data from a measurement device that identifies the temperature of the reheat steam or provides a signal that is based on such a detected temperature to the second reheat steam controller 92. The set point value for the reheat steam temperature utilized by the second reheat steam controller 92 can be based on data it received from the first controller 21 or the distributed control system 23 or can be a value that is otherwise define in memory of the second reheat steam controller 92.

Data generated by measurement devices measuring the temperature of the steam fed into the first reheat steam desuperheater device 63 and output from the first reheat steam desuperheater device 63 can also be sent to another device and/or a third reheat steam controller 93 for use in generation of control signals for other plant elements. For example, data generated by measurement devices measuring the temperature of the steam fed into and out of the first reheat steam desuperheater device 63 can be fed to a differential detector device Δ that may generate a signal or otherwise send data based on a difference in the input and output steam temperatures of the first reheat steam desuperheater device 63. That data can be sent to a circuit or other type of electrical device 69 for subsequent processing prior to sending that data to the third reheat steam controller 93. The third reheat steam controller 93 can generate a control signal for adjusting a tilting of burners of the combustion unit based on such data as well as data relating to the reheat steam temperature to be output to the intermediate and/or low pressure turbines that it can receive from a measuring device that monitors the temperature of the reheat steam to be output to the low and/or intermediate pressure turbines.

A fourth reheat steam controller 94 can also be utilized to affect process parameters relating to steam temperature. For instance, the fourth reheat steam controller 94 can also receive the data relating to the reheat steam temperature to be output to the intermediate and/or low pressure turbines for use in generation of a control signal that is sent to a fifth reheat steam controller 95 for generation of a control signal for sending to a fan 71 that can be configured to drive a flow rate of flue gas to be recycled to the combustion unit 3. The fifth reheat steam controller 95 can be configured to generate the control signal for the fan 71 based on data it receives from the fourth reheat steam controller 94 and a flow rate of flue gas being recirculated from the desulfurization unit 11 to the combustion unit 3. The fifth reheat steam controller 95 can receive data from a measurement device that monitors the flow rate of the flue gas being recirculated from the desulfurization unit 11 to the combustion unit 3 for use in generating the control signal for the fan 71. In some embodiments, that flow rate data may be data based on a measured flow rate or a signal that is correlated with that measured flow rate or otherwise is generated based on that measured flow rate.

Based on simulations and other testing, it has been determined that embodiments of the adaptive second controller 30 can provide better transient performance than conventional PID controllers and can also reduce process transients caused by disturbances of changing power output of a power generation unit 8 and/or thermal load of a combustion unit 3 or plant 1. It has been determined that embodiments of the second controllers 30 can be utilized such that embodiments of the plant 1 can have a relative fast adaptation of transient response to certain conditions that may arise during operations of the plant 1. For instance, the state predictor component 35 of the architecture of the adaptive second controller can offer a model estimation of dynamics of the plant while the adaptive law component 37 addresses mismatches, or inaccuracies, the model may have with the actual performance of the plant to correct for errors that may exist in the model utilized by the adaptive second controller 30. Further, embodiments of the adaptive second controller 30 do not require a model of the plant so that the design of the adaptive second controller 30 can be simplified as compared to conventional controllers that may be utilized in industrial plants such as proportional-integral-derivative (PID) controllers. Further, while conventional controllers can fail if dynamics of a plant change, embodiments of the adaptive second controller 30 can be configured to provide good control performance in such conditions. For instance, it has been determined that utilization of the second controllers 30 can be configured to provide control of steam temperature to be output to a high pressure turbine to be more unify by having a 25% reduction in steam temperature deviation and was also determined to provide a 47% reduction in reheat steam temperature deviation. Use of the adaptive second controllers 30 was also determined to decrease the deviation between the desired set point value and a maximum temperature while also decreasing the deviation between a desired set point vale and a minimum temperature value.

It should be appreciated that any of the above noted features of a plant such as an industrial plant or electricity production plant in any particular embodiment expressly discussed herein may be combined with other features or elements of other embodiments except when such a combination would be mutually exclusive or otherwise incompatible therewith as may be appreciated by those of at least ordinary skill in the art. It should also be understood that measurement data sent to a second controller 30 by at least one measurement device can include a signal or other type of data that is generated by that device based on a measured temperature, pressure, flow rate, or other parameter sensed or detected by the measurement device. It should also be appreciated that different variations to the above discussed embodiments may be made to meet a particular set of design criteria. For instance, a combustion unit can be configured to include at least one combustor such as a furnace of a boiler unit that is configured to combust fuel in multiple combustion zones. The furnace of such a boiler unit may include only one burner or may include a plurality of spaced apart burners. As yet another example, heat exchangers, pumps, fans, valves, measurement sensors, measurement detectors and other types of measurement devices, conduit elements (e.g. tubes, pipes, ducts, vessels, etc.) and other elements may also be added to embodiments of the system to facilitate fluid movement or help control changes in the operation of the system. As yet another example, the ASU may have multiple storage tanks, such as multiple oxygen retaining vessels, for retaining oxygen gas or storing such gas until that gas is needed to be fed to the combustion unit.

While the invention has been described with reference to various exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of controlling at least one operational parameter of a plant having a combustion unit comprising:
   (a) estimating a status of at least one operational variable of the plant to identify an estimated value for the operational variable;
   (b) for each operational variable, comparing the estimated value for the operational variable with a measured value of the operational variable to determine an uncertainty value based on a difference in value between the measured value and the estimated value for the operational variable; and
   (c) generating a control signal based on a reference signal, the measured value, and the deviation value for sending to at least one element of the plant for controlling a process of the plant;

wherein the estimating of the status of the at least one operational variable of the plant to identify the estimated value for the operational variable is performed based on calculating:

$$\hat{x}(t) = A_m \hat{x}(t) + B_m u(t) + \hat{\sigma}(t),$$

where t is time within a sampling time (T),
where u(t) is a control signal value,
where $\hat{x}(t)$ is an estimated value for the operational variable at time (t);
$A_m$ is a first model parameter of a state predictor,
$B_m$ is a second model parameter of the state predictor, and
$\hat{\sigma}(t)$ is equal to $\hat{\sigma}((iT), t \in (iT, i+1)T)$, where i is an integer within a pre-specified range of integers and where:

ô((iT) is equal to $-\Phi^{-1}(T)\mu(iT)$, $\Phi(T)$ is equal to $\int_0^T e^{A_m(T-\tau)}d\tau$, $\mu(iT)$ is equal to $e^{A_m T} \tilde{x}(iT)$, and $\tilde{x}$ is a difference between the estimated value for the operational variable and the measured value for the operational parameter.

2. The method of claim 1, wherein the combustion unit is a boiler.

3. The method of claim 2, wherein the operational parameter of the plant is steam temperature in the boiler.

4. The method of claim 1, wherein the comparing the estimated value for the operational variable with a measured value of the operational variable to determine an uncertainty value based on a difference in value between the measured value and the estimated value for the operational variable is based on calculating:

$\tilde{x}=x(t)-\hat{x}(t)$, where:

x(t) is the measured value for the operational parameter at time (t).

5. The method of claim 4, wherein the generation of the control signal is based on calculating:

$u(s)=k_g r(s)+C(s)B_m^{-1}\hat{o}(s)$, where:

u(s) is a Laplace transform of u(t), kg is a DC gain of an internal model, r(s) is a Laplace transform of a reference signal, and C(s) is a Laplace transform of a filter.

6. The method of claim 5, wherein $u(s)=k_g r(s)+C(s)B_m^{-1}\hat{o}(s)$, $\hat{x}(t)=A_m\hat{x}(t)+B_m u(t)+\hat{o}(t)$, and $u(s)=k_g r(s)+C(s)B_m^{-1}\hat{o}(s)$ are calculated simultaneously by a controller for generation of the control signal, the controller comprising hardware, the hardware of the controller comprising a processor, non transitory memory communicatively connected to the processor and at least one transceiver unit communicatively connected to the processor.

7. The method of claim 5, comprising:

tuning a bandwidth of the filter, the first model parameter of the state predictor and the second model parameter of the state predictor.

8. The method of claim 7, wherein the tuning of the bandwidth of the filter, parameter of the state predictor and the second model parameter of the state predictor occurs prior to steps (a)-(c).

9. An apparatus comprising:

at least one controller being configured to be connected to a combustion unit of a plant, the controller including hardware having at least one processor, non-transitory memory communicatively connected to the processor, and at least one transceiver unit communicatively connected to the processor;

the controller being configured to communicate with at least one element of the combustion unit to control at least one operational parameter of the combustion unit when connected to the combustion unit, the controller being configured to execute a control process which includes:

(a) estimating a status of at least one operational variable of the plant to identify an estimated value for the operational variable;

(b) for each operational variable, comparing the estimated value for the operational variable with a measured value of the operational variable to determine an uncertainty value based on a difference in value between the measured value and the estimated value for the operational variable; and (c) generating a control signal based on a reference signal, the measured value, and the deviation value for sending to at least one element of the plant for controlling a process of the plan;

wherein the estimating of the status of the at least one operational variable of the plant to identify the estimated value for the operational variable is to be performed based on calculating: $\hat{x}(t)=A_m\hat{x}(t)+B_m u(t)+\hat{o}(t)$, where t is time within a sampling time (T), where u(t) is a control signal value, where $\hat{x}(t)$ is an estimated value for the operational variable at time (t);

$A_m$ is a first model parameter of a state predictor, $B_m$ is a second model parameter of the state predictor, and $\hat{o}(t)$ is equal to $\hat{o}(iT)$, $t\in(iT, i+1)T$, where i is an integer within a pre-specified range of integers and where:

ô((iT) is equal to $-\Phi^{-1}(T)\mu(iT)$, $\Phi(T)$ is equal to $\int_0^T e^{A_m(T-\tau)}d\tau$, $\mu(iT)$ is equal to $e^{A_m T} \tilde{x}(iT)$, and $\tilde{x}$ is a difference between the estimated value for the operational variable and the measured value for the operational parameter.

10. The apparatus of claim 9, wherein the comparing the estimated value for the operational variable with a measured value of the operational variable to determine an uncertainty value based on a difference in value between the measured value and the estimated value for the operational variable is to be based on calculating:

$\tilde{x}=x(t)-\hat{x}(t)$, where:

x(t) is the measured value for the operational parameter at time (t).

11. The apparatus of claim 10, wherein the generation of the control signal is to be based on calculating:

$u(s)=k_g r(s)+C(s)B_m^{-1}\hat{o}(s)$, where:

u(s) is a Laplace transform of u(t), kg is a DC: gain of an internal model, r(s) is a Laplace transform of a reference signal, and C(s) is a Laplace transform of a filter.

12. The apparatus of claim 11, wherein $u(s)=k_g r(s)+C(s)B_m^{-1}\hat{o}(s)$, $\hat{x}(t)=A_m\hat{x}(t)+B_m u(t)+\hat{o}(t)$, and $u(s)=k_g r(s)+C(s)B_m^{-1}\hat{o}(s)$ are to be calculated simultaneously.

13. The apparatus of claim 12, wherein the combustion unit of the plant is a boiler and the operational parameter is a steam temperature of steam to be output from the boiler to at least one turbine.

* * * * *